(12) United States Patent
Matsuoka

(10) Patent No.: US 6,724,929 B1
(45) Date of Patent: Apr. 20, 2004

(54) WAFER INSPECTING APPARATUS

(75) Inventor: Ryoichi Matsuoka, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/537,945

(22) Filed: Mar. 29, 2000

(30) Foreign Application Priority Data

Apr. 2, 1999 (JP) .......................................... 11-096853

(51) Int. Cl.⁷ ................................................ G06K 9/00
(52) U.S. Cl. ........................ 382/145; 382/147; 382/149
(58) Field of Search ............................... 382/112, 141, 382/144, 145, 149, 147, 181, 216; 714/724, 728, 733; 356/237.3, 237.4, 237.5

(56) References Cited

U.S. PATENT DOCUMENTS

| | | | | |
|---|---|---|---|---|
| 4,277,175 A | * | 7/1981 | Karasaki et al. ............ | 356/394 |
| 4,589,140 A | * | 5/1986 | Bishop et al. ............... | 382/148 |
| 4,801,869 A | * | 1/1989 | Sprogis ........................ | 714/733 |
| 5,046,109 A | * | 9/1991 | Fujimori et al. ............ | 382/144 |
| 5,355,212 A | * | 10/1994 | Wells et al. ............... | 356/237.4 |
| 5,960,106 A | * | 9/1999 | Tsuchiya et al. ............ | 382/144 |
| 6,334,097 B1 | * | 12/2001 | Yoshitake et al. ........... | 702/185 |
| 6,444,895 B1 | * | 9/2002 | Nikawa ........................ | 136/212 |
| 6,449,385 B1 | * | 9/2002 | Huber et al. ................. | 382/112 |
| 6,476,913 B1 | * | 11/2002 | Machida et al. ............. | 356/394 |

* cited by examiner

Primary Examiner—Andrew W. Johns
Assistant Examiner—Amir Alavi
(74) Attorney, Agent, or Firm—Adams & Wilks

(57) ABSTRACT

To provide a wafer inspecting apparatus for classifying by kind defects appearing on a patterned wafer, a wafer is inspected by a wafer defect inspecting apparatus unit and coordinate value data representing positions and sizes of defects on the sample is output thereby. The coordinate value data is supplied to an image data forming unit and graphic images representing defects on the wafer are formed for respective chips on the wafer, and image data is produced. The image data is output to a pattern overlap evaluating unit which analyzes a state of overlap of a first image corresponding to the image data and a second image representing the circuit pattern based on the wiring information and outputting overlap analysis data. A defect kind automatic classifying unit receives the overlap analysis data and classifies defects by kind of defect based on the overlap analysis data.

20 Claims, 5 Drawing Sheets

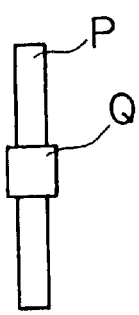
FIG. 4A
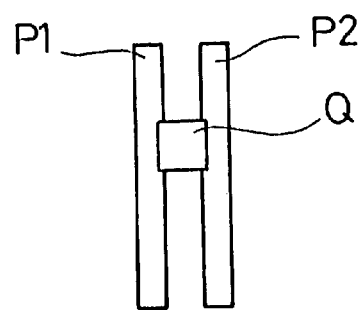
FIG. 4B
FIG. 4C
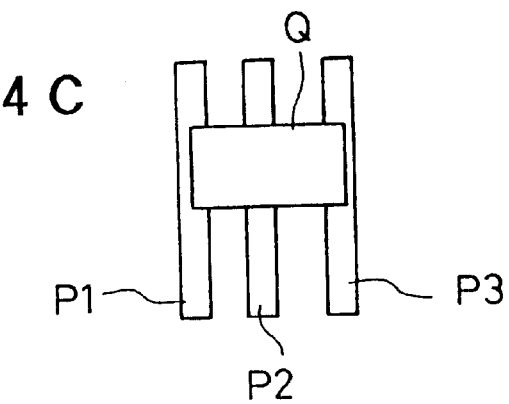
FIG. 4D
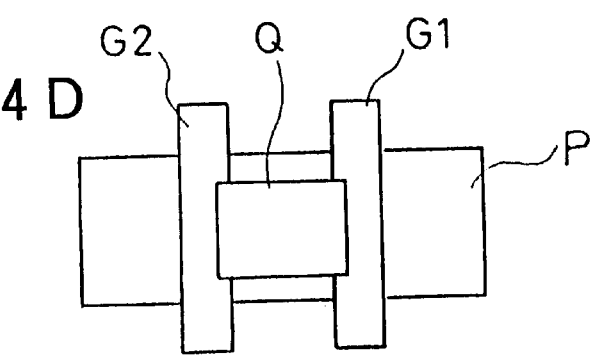

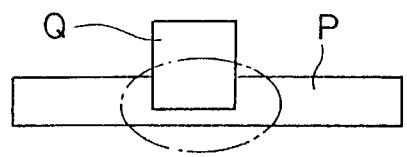
FIG. 4E
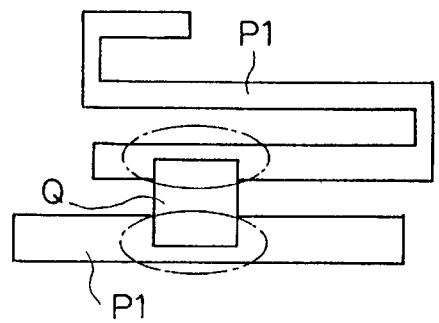
FIG. 4F
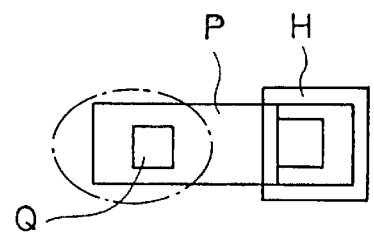
FIG. 4G
FIG. 4H
FIG. 4I
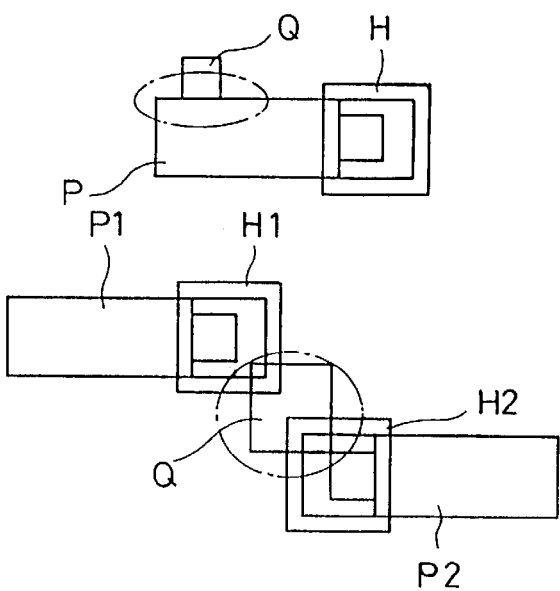

WAFER INSPECTING APPARATUS

BACKGROUND OF THE INVENTION

1. Field of the Invention

The present invention relates to a wafer inspecting apparatus for classifying kinds of defects on a face to be inspected of a wafer formed with a circuit pattern by using, for example, a CAD (Computer Aided Design) apparatus.

2. Description of the Related Art

FIG. 2 is an outline constitution diagram showing an example of a conventional wafer inspecting apparatus.

The wafer inspecting apparatus is provided with a patterned wafer defect inspecting unit 1. The patterned wafer defect inspecting unit 1 is provided with a function of sampling for respective chips an image of a face to be inspected of a wafer formed with a circuit pattern based on wiring information of a circuit for the respective chips and forming and outputting coordinate value data S1 representing positions and sizes of defects present on the face to be inspected for the respective chips. A wafer map display unit 2 is connected to an output side of the patterned wafer defect inspecting unit 1. The wafer map display unit 2 inputs the coordinate value data S1 and displays the positions and the sizes of the defects present on the face to be inspected of the respective chips by using a wafer map.

According to the wafer inspecting apparatus, a wafer constituting an object of inspection is inspected by the wafer defect inspecting unit 1 and the coordinate value data S1 is output by the wafer defect inspecting unit 1. The coordinate value data S1 is input to the wafer map display unit 2 and a wafer map in correspondence with the coordinate value data S1 is displayed by the wafer map display unit 2.

FIG. 3 is a schematic diagram showing an example of a display screen of the wafer map display unit 2 in FIG. 2.

According to the display screen, a number of defects is displayed by a numeral at a corresponding location and a shape of a defect is displayed by, for example, a mark. Further, according to the wafer inspecting apparatus, there is carried out a defect control concerning a defect distribution, a number of defects and sizes of defects in the wafer map of FIG. 3 by optical observation of an operator and a defect analysis is carried out using a sampling method.

However, according to the conventional wafer inspecting apparatus of FIG. 2, there are the following problems itemized as (i) and (ii).

(i) According to the wafer inspecting apparatus of FIG. 2, only defects are displayed on the display screen and a defect analysis taking into consideration a correlation between defects and a circuit pattern cannot be carried out.

(ii) According to the wafer inspecting apparatus of FIG. 2, the apparatus cannot express a correlation relationship between the circuit pattern and positions of defects as well as sizes of defects. Therefore, for example, when two patterns are shortcircuited, the apparatus cannot determine whether a serious defect is constituted.

SUMMARY OF THE INVENTION

In order to resolve the above-described problems, according to an aspect of the invention, there is provided a wafer inspecting apparatus comprising wafer inspecting means for acquiring for respective chips an image of a face to be inspected of a wafer formed with a circuit pattern based on wiring information of a circuit at the respective chips and forming and outputting coordinate value data representing positions and sizes of defects present on the face to be inspected for the respective chips, image data forming means for forming graphic figures representing the respective defects based on the respective coordinate value data for the respective chips and generating image data in correspondence with the graphic figures, analyzing means for inputting the image data, analyzing a state of overlapping of a first image in correspondence with the image data and a second image representing the circuit pattern based on the image information and outputting analyzed data, and classifying means for inputting the analyzed data and classifying a kind of the respective defect based on the analyzed data.

By adopting such a construction, the wafer is subjected to the wafer inspecting means, the image of the face to be inspected of the wafer is sampled for the respective chips and the coordinate value data representing the positions and the sizes of the defects is output by the wafer inspecting means. The coordinate value data is input to the image data forming means and the image data is output by the image data forming means. The image data is input to the analyzing means, the state of overlapping of the first image in correspondence with the image data and portions of the second image representing the circuit pattern in correspondence with the coordinate value data is analyzed and the analyzed data is output by the analyzing means. The analyzed data is input to the classifying means and the kind of the respective defect is classified by the classifying means.

BRIEF DESCRIPTION OF THE DRAWINGS

FIGS. 4A, 4B, 4C, 4D, 4E, 4F, 4G, 4H and 4I are schematic diagrams showing states of overlapping patterns in the case of FIG. 1.

DETAILED DESCRIPTION OF THE PREFERRED EMBODIMENTS

Figure 1:
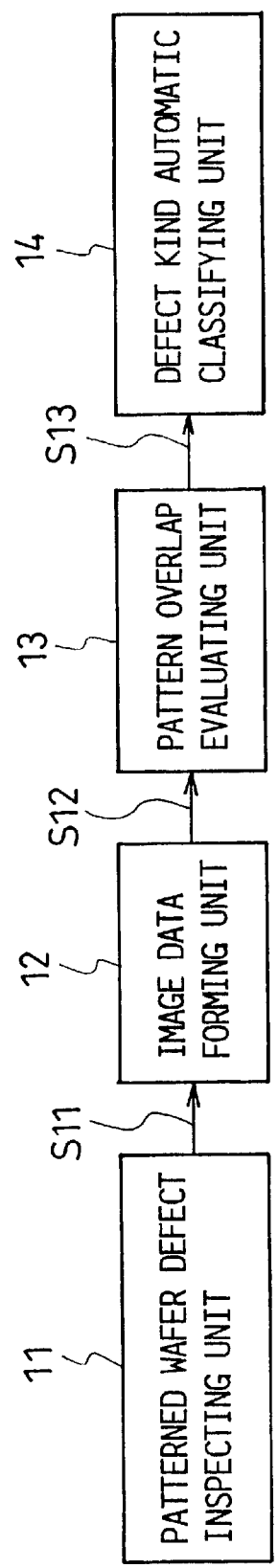
FIG. 1 is a constitution diagram of a wafer inspecting apparatus according to an embodiment of the invention.
Figure 2:
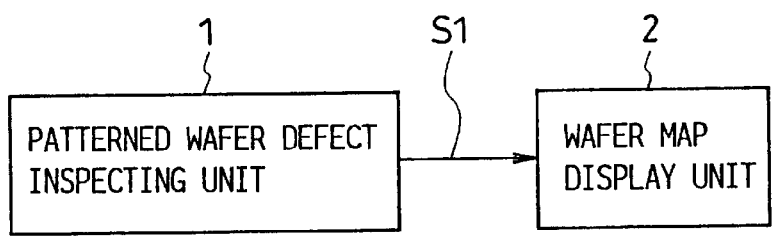
FIG. 2 is a constitution diagram of a conventional wafer inspecting apparatus.
Figure 3:
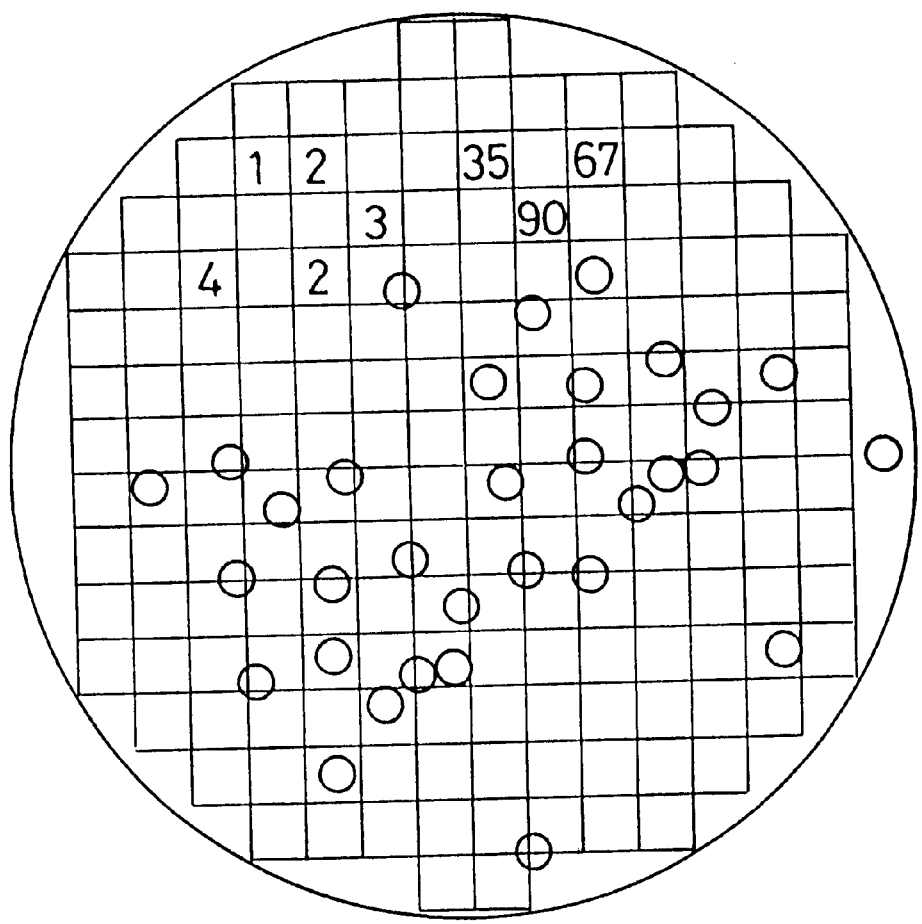
FIG. 3 is a schematic diagram of a display screen in the case of FIG. 2.

FIG. 1 is an outline constitution diagram of a wafer inspecting apparatus showing an embodiment of the invention.

The wafer inspecting apparatus is provided with wafer inspecting means (for example, patterned wafer defect inspecting unit) 11. The patterned wafer defect inspecting unit 11 is provided with, for example, a scanning electron microscope (hereinafter, referred to as "SEM") and is provided with a function of acquiring for respective chips an image of a face to be inspected of a wafer formed with a circuit pattern based on wiring information of a circuit for respective chips and forming and outputting coordinate value data S11 representing positions and sizes of defects present on the face to be inspected for the respective chips. Image data forming means (for example, image data forming unit) 12 is connected to an output side of the patterned wafer defect inspecting unit 11. The image data forming unit 12 is constituted by, for example, a CAD apparatus for generating image data S12 by forming graphic figures representing the respective defects based on the respective coordinate value data S11 for the respective chips. Analyzing means (for example, pattern overlap evaluating unit) 13 is connected to an output side of the data forming unit 12. The pattern overlap evaluating unit 13 is constituted by, for example, a CAD apparatus and is provided with a function of inputting image data S12, analyzing a state of overlap of a first image in correspondence with the image data S12 and a second image representing a circuit pattern based on the wiring information and outputting analyzed data S13. Classifying means (for example, defect kind automatic classifying unit)

14 is connected to an output side of the pattern overlap evaluating unit 13. The defect kind automatic classifying unit 14 is constituted by, for example, a CAD apparatus for inputting the analyzed data S13 and classifying kinds of the respective defects based on the analyzed data S13.

FIGS. 4A, 4B, 4C, 4D, 4E, 4F, 4G, 4H and 4I are schematic diagrams showing examples of states of overlapping patterns classified by the defect kind automatic classifying unit 14 in FIG. 1.

An explanation will be given of operation in the case of FIG. 1 in reference to these diagrams.

According to the wafer inspecting apparatus, a wafer constituting an object of inspection is inspected by the wafer defect inspecting unit 11 and the coordinate value data S11 is output by the wafer defect inspecting unit 11. The coordinate value data S11 is input to the image data forming unit 12 and graphic figures (for example, CAD graphic figures) representing defects of the wafer are formed for the respective chips and the image data S12 is generated by the image data forming unit 12. The image data S12 is input to the pattern overlap evaluating unit 13 and at the pattern overlap evaluating unit 13, a state of overlapping of a first image in correspondence with the image data S12 and a second image representing a circuit pattern based on wiring information of a circuit is analyzed and the analyzed data S13 is output. In this case, the analyzed data S13 is calculated by comparing a large or small relationship between a coordinate value of a region occupied by the circuit pattern and a coordinate value of a region occupied by foreign matter. The analyzed data S13 is input to the defect kind automatic classifying unit 14 and at the defect kind automatic classifying unit 14, the kinds of defects present on a face to be inspected of the respective chips are classified. Categories of the classification are specified by, for example, the following items (a), (b), (c) and (d).

(a) Classification based on an electric condition (for example, a relationship between a circuit pattern, a gate or a via hole and foreign matter).

(b) Classification based on a figure of foreign matter (for example, a size or an overlap amount of foreign matter).

(c) Classification based on regional condition (that is, a region where foreign matter is present).

(d) Classification based on an inspecting step (that is, a step where foreign matter is caused).

Classification of an overlapped state of a pattern is specified by, for example, (Example 1) through (Example 5) shown below.

EXAMPLE 1

Classification Based on a Number of Overlap of Pattern

For example, FIG. 4A shows that a pattern P and foreign matter Q overlap each other, which is classified as cut of the pattern P by the defect kind automatic classifying unit 14. FIG. 4B shows that a pattern P1 is connected to a pattern P2 via the foreign matter Q, which is classified as "short level 1" by the defect kind automatic classifying unit 14. FIG. 4C shows that patterns P1, P2 and P3 are connected via the foreign matter Q, which is classified as "short level 2" by the defect kind automatic classifying unit 14.

EXAMPLE 2

Classification Based on Foreign Matter at Vicinity of Gate

For example, FIG. 4D shows that gate patterns G1 and G2 formed on the pattern P are connected via the foreign matter Q, which is classified as "foreign matter at vicinity of gate" by the defect kind automatic classifying unit 14.

EXAMPLE 3

Classification Based on Overlap

For example, FIG. 4E shows that there is a portion at which the foreign matter Q overlaps the pattern P at one location, which is classified as "overlap one location" by the defect kind automatic classifying unit 14. FIG. 4F shows that there are portions at which the foreign matter Q overlaps the pattern P1 or P2 at one location of each of the patterns P1 and P2, which is classified as "overlap two locations" by the defect kind automatic classifying unit 14.

EXAMPLE 4

Classification Based on Incorporation

For example, FIG. 4G shows that a via hole H is connected to an end portion of the pattern P and the foreign matter Q is incorporated in the pattern P, which is classified as "incorporation one location" by the defect kind automatic classifying unit 14.

EXAMPLE 5

Classification Based on Contact

For example, FIG. 4H shows that the via hole H is connected to the end portion of the pattern P and the foreign matter Q is brought into contact with the pattern P, which is classified as "contact one location" by the defect kind automatic classifying unit 14. FIG. 4I shows that via holes H1 and H2 are respectively connected to end portions of patterns P1 and P2 and the foreign matter Q is brought into contact with the via holes H1 and H2, which is classified as "contact two locations" by the defect kind automatic classifying unit 14.

When a wafer is inspected by using the wafer inspecting apparatus in the midst of steps of fabricating the wafer, an overlap state of a pattern is classified as shown by (Example 1) through (Example 5) and it is determined whether fabrication operation in successive steps can be carried out or not.

As described above, according to the embodiment, correlation relationships between the foreign matter Q and circuit patterns P, P1 and P2 and via holes H1 and H2 are classified by the defect kind automatic classifying unit 14 and accordingly, it is determined at a high speed whether a serious defect is constituted. Further, when a serious defect is determined, fabrication operation is not carried out at successive steps and accordingly, the yield of the wafer is promoted and efficient fabrication operation is carried out.

Further, the invention is not limited to the above-described embodiment but can be modified variously. For example, there are modified examples shown below.

(a) The patterned wafer defect inspecting unit 11 may be an arbitrary apparatus so far as the apparatus samples an image of a face to be inspected of a wafer and outputting the coordinate value data S11 of defects, other than SEM.

(b) The image data forming unit 12 is not limited to a CAD apparatus but may be an arbitrary apparatus so far as the apparatus generates the image data S12.

(c) The pattern overlap evaluating unit 13 is not limited to a CAD apparatus but may be an arbitrary apparatus so far as the apparatus generates the analyzed data S13.

(d) The defect kind automatic classifying unit 14 is not limited to a CAD apparatus but may be an arbitrary apparatus so far as the apparatus inputs the analyzed data S13 and classifies kinds of respective defects.

As has been explained in details, according to the aspect of the invention, the correlation relationship between defects and a circuit pattern is classified by the classifying means and accordingly, it is determined at a high speed whether a serious defect is constituted. Further, when a serious defect is determined, fabrication operation is not carried out at successive steps and therefore, the yield of the wafer can be promoted and efficient fabrication operation can be carried out.

What is claimed is:

1. A wafer inspecting apparatus comprising:

wafer inspecting means for acquiring for a respective chip an image of a face to be inspected of a wafer having formed thereon a circuit pattern based on wiring information of a circuit for the respective chip and generating and outputting coordinate value data representing positions and sizes of defects present on the face of the wafer to be inspected for the respective chip;

image data forming means for forming graphic images representing the respective defects based on the respective coordinate value data for the respective chip and generating image data corresponding to the graphic images;

analyzing means for inputting the image data, analyzing a state of overlap of a first image corresponding to the image data and a second image representing the circuit pattern based on the wiring information and outputting overlap analysis data; and classifying means for inputting the overlap analysis data and classifying the defects by kind of defect based on the overlap analysis data.

2. A wafer inspecting apparatus according to claim 1; wherein the classifying means includes means for classifying defects based on one or more of the effect of the defect on the electrical characteristics of a circuit on which the defect appears, shape of the defect, regional condition of the wafer in the region of the defect, process step where the defect is caused, and degree of overlap caused by the defect.

3. A wafer inspecting apparatus according to claim 1; wherein the classifying means includes means for classifying a defect based on at least one of a number of patterns on the wafer affected by the defect, a type of pattern affected by the defect, a proximity of the defect to a specific pattern, incorporation of the defect in a pattern and contact of the defect with a pattern.

4. A wafer inspecting apparatus according to claim 1; wherein the wafer inspecting means comprises a patterned wafer defect inspecting unit.

5. A wafer inspecting apparatus according to claim 4; wherein the patterned wafer defect inspecting unit comprises a microscope.

6. A wafer inspecting apparatus according to claim 4; wherein the patterned wafer defect inspecting unit comprises a scanning electron microscope.

7. A wafer inspecting apparatus according to claim 1; wherein the image data forming means comprises an image data forming unit.

8. A wafer inspecting apparatus according to claim 7; wherein the image data forming unit comprises a CAD unit programmed to form defect images representing defects based on the coordinate value data and to output the image data corresponding to the defect images.

9. A wafer inspecting apparatus according to claim 8; wherein the analyzing means comprises the CAD unit.

10. A wafer inspecting apparatus according to claim 1; wherein the analyzing means comprises a CAD unit.

11. A sample inspecting apparatus comprising:

a sample inspecting unit for acquiring an image of a sample and outputting coordinate data representing defects present on the sample;

an image data forming unit for forming a graphic image representing a defect on the sample based on the coordinate data and generating image data corresponding to the graphic image;

a pattern overlap evaluating unit for analyzing overlap of a first image corresponding to the image data and a second image representing the sample and outputting overlap analysis data; and a defect kind automatic classifying unit for inputting the overlap analysis data and classifying the defects by kind of defect based on the overlap analysis data.

12. A sample inspecting apparatus according to claim 11; wherein the sample inspecting unit comprises a patterned wafer defect inspecting unit which acquires for respective chips formed on a wafer an image of a surface of the wafer having a circuit pattern formed thereon based on wiring information of a circuit of the respective chips and outputs for the respective chips coordinate data representing positions and sizes of defects present on the surface of the wafer.

13. A sample inspecting unit according to claim 12; wherein the patterned wafer defect inspecting unit comprises a microscope.

14. A sample inspecting unit according to claim 12; wherein the patterned wafer defect inspecting unit comprises a scanning electron microscope.

15. A wafer inspecting apparatus according to claim 12; wherein the defect kind automatic classifying unit includes means for classifying defects based on one or more of the effect on electrical characteristics of a circuit on which the defect appears, shape of the defect, regional condition of the wafer in the region of the defect, process step where the defect is caused, and degree of overlap caused by the defect.

16. A wafer inspecting apparatus according to claim 12; wherein the defect kind automatic classifying unit includes means for classifying a defect based on at least one of a number of patterns on the wafer affected by the defect, a type of pattern affected by the defect, a proximity of the defect to a specific pattern, incorporation of the defect in a pattern and contact of the defect with a pattern.

17. A wafer inspecting apparatus according to claim 11; wherein the defect kind automatic classifying unit comprises a CAD unit.

18. A sample inspecting unit according to claim 17; wherein the image data forming unit comprises the CAD unit programmed to form defect images representing defects based on the coordinate value data and to output the image data corresponding to the defect images.

19. A sample inspecting unit according to claim 18; wherein the pattern overlap evaluating unit comprises the CAD unit.

20. A sample inspecting unit according to claim 11; wherein the pattern overlap evaluating unit comprises a CAD unit.

* * * * *